United States Patent [19]

Yamamoto et al.

[11] Patent Number: 6,121,372
[45] Date of Patent: Sep. 19, 2000

[54] AQUEOUS EMULSION COMPONENT FOR A WATER- AND OIL-REPELLANT AGENT

[75] Inventors: Kazuhiro Yamamoto; Yuzuru Ishida, both of Kitaibaraki, Japan

[73] Assignee: Nippon Mektron Limited, Tokyo, Japan

[21] Appl. No.: 09/245,647

[22] Filed: Feb. 8, 1999

[30] Foreign Application Priority Data

Mar. 6, 1998 [JP] Japan .................................. 10-073132

[51] Int. Cl.$^7$ .................................. C08J 2/16; C08K 2/16
[52] U.S. Cl. .......................... 524/805; 524/544; 524/460; 524/758; 524/832
[58] Field of Search .................... 524/544, 805, 524/460, 758, 832

[56] References Cited

U.S. PATENT DOCUMENTS 5,639,820  6/1997  Kubo et al. .............................. 524/758
5,852,095  12/1998  Yamauchi et al. ...................... 524/460

FOREIGN PATENT DOCUMENTS 5-17538   1/1993  Japan .
5-263070  10/1993  Japan .
5-279541  10/1993  Japan .
6-17034   1/1994  Japan .
7-173772  7/1995  Japan .

*Primary Examiner*—Bernard Lipman
*Assistant Examiner*—Kelechi Egwim
*Attorney, Agent, or Firm*—Barnes & Thornburg

[57] ABSTRACT

An aqueous emulsion for use as a water- and oil-repellent agent, which aqueous emulsion is produced by copolymerizing least one of lower alkyl methacrylate, benzyl (meth) acrylate and vinylidene chloride with polyfluoroalkyl group-containing (meth)acrylate ester, dispersed in water and in the presence of a nonionic emulsifier containing $\alpha$-[1-(allyloxy) methyl-2-(p-nonylphenoxy)ethyl]-$\omega$-hydroxy (polyoxyethylene). The resulting aqueous emulsion is completely free from organic solvents and has a distinguishing freeze-thaw stability.

13 Claims, No Drawings

AQUEOUS EMULSION COMPONENT FOR A WATER- AND OIL-REPELLANT AGENT

BACKGROUND OF THE INVENTION

1. Field of the Invention

The present invention relates to an aqueous emulsion, and more particularly to an aqueous emulsion applicable to an effective component of a water- and oil-repellent agent, etc.

2. Description of Related Art

Conventional water- and oil-repellent agents including water-soluble organic solvents such as acetone, ethyl acetate, etc. have a distinguished freeze-thaw stability, but still have such problems as contamination of working circumstances due to use of organic solvents or contamination of effluent water with organic solvents, resulting in an increase m BOD and COD, etc.

"Freeze-thaw stability" is one of test items, which determines such a property of an emulsion of a water- and oil-repellent agent as return to the original state or not when the emulsion is once frozen and then returned to room temperature. Poor freeze-thaw stability indicates occurrence of such phenomena as precipitation, increased viscosity or sometimes solidification during the transport in cold districts. Once denaturing of the emulsion occurs due to such phenomena, the commercial value of the water- and oil-repellent agent will be entirely lost.

The following water- and oil-repellent agents including water-soluble organic solvents have been so far proposed.

JP-A-7-173772 discloses a water-emulsifiable, fluorine-based water- and oil-repellent agent which comprises 100 parts by weight of polyfluoroalkyl group-containing polymer and 1 to 20 parts by weight of glycol. In the conventional emulsion polymerization to form water-dispersible, water- and oil-repellent polymers, at least 50 parts by weight of a low boiling organic solvent such as acetone, ethyl acetate, etc. is used per 100 parts by weight of a monomer mixture to improve the compatibility of polyfluoroalkyl group-containing monomers with an aqueous medium or with other comonomers, where the residual organic solvent, if any, lowers the color fastness. By using a smaller amount of glycol, the disadvantage can be improved, but the glycol as an organic solvent still remains in the resulting water- and oil-repellent aqueous emulsion.

JP-A-5-263070 discloses that emulsion polymerization of fluoroalk-yl group-containing monomers is carried out in an aqueous solution containing a specific glycol ether or glycol ester. It is discloses that the proportion of these glycols to be used can be reduced to about 10 to about 30 parts by weight per 100 parts by weight of the monomer mixture in contrast to a proportion of the ordinary organic solvent of about 60 to about 100 part by weight, but the glycols as an organic solvent also still remains in the resulting water- and oil-repellent aqueous emulsion.

JP-A-6-17034 discloses a water- and oil-repellent aqueous latex where polyfluoroalkyl group-containing polymers are dispersed in an aqueous medium containing a glycol ether-typed solvent. It is disclosed that a proportion of the glycol ether-typed solvent to be used is about 50 to about 5% by weight on the basis of total weight of the emulsion including water, and thus a considerably large amount of the organic solvent is used.

JP-A-5-279541 discloses that various organic solvents such as acetone, etc. are present in the emulsion polymerization to form fluorine-containing copolymers, where it is stated that a considerable portion of the solvent can be made to remain in the resulting aqueous dispersion, but a complicated, expensive procedure for removing the solvent at 40° to 90° C. in vacuum is used from the viewpoints of safety and industrial sanitation.

JP-A-5-17538 discloses formation of an aqueous emulsion by once emulsifying and dispersing perfluoroalkyl acrylate, carboxyl group-containing α, β-ethylenic unsaturated monomer and hydroxy group-containing α, β-ethylenic unsaturated monomer into water to form particles having particle sizes of not more than 0.3 μm, followed by polymerization. Though the disclosed procedure uses no organic solvent, not only a complicated means of conducting ultrasonic irradiation for 60 minutes while bubbling the emulsion having an average particle size of about 1μm with a nitrogen gas is used to make the particle size not more than 0.3μm, but also there is a possibility of precipitation when only a small amount of a cationic component is mixed therein during the water- and oil-repellent processing such as dipping, etc. because the resulting copolymers partially contain carboxyl groups.

SUMMARY OF THE INVENTION

An object of the present invention is to provide an aqueous emulsion completely free from organic solvents and having distinguished freeze-thaw stability, which is effectively used as a water- and oil-repellent agent, etc.

The object of the present invention can be attained by an aqueous emulsion, which comprises a copolymer of at least one of lower alkyl methacrylate, benzyl (meth)acrylate and vinylidene chloride with polyfluoroalkyl group-containing (meth)acrylate ester, as dispersed in water, in the presence of a nonionic emulsifier containing α-[1-(allyloxy)methyl-2-(p-nonylphenoxy)-ethyl- ω-hydroxy(polyoxyethylene).

DETAILED DESCRIPTION OF THE INVENTION

Polyfluoroalkyl group-containing (meth)acrylate ester for use in the present invention in copolymerization with lower alkyl methacrylate with an alkyl group having 1 to 4 carbon atom, benzyl acrylate, benzyl methacrylate or vinylidene chloride can be represented by the following general formula:

$$CH_2=CRCOOR_1Rf$$

where R is a hydrogen atom or a methyl group, $R_1$ is a divalent organic group and Rf is a perfluoroalkyl group having 4 to 20 carbon atoms and includes, for example, the following (meth)acrylate ester compounds.

$CH_2=CHCOOC_2H_4C_nF_{2+1}$
$CH_2=C(CH_3)COOC_2H_4C_nF_{2n+1}$
$CH_2=CHCOOC_4H_8C_nF_{2n+1}$
$CH_2=C(CH_3)COOC_4H_8C_nF_{2n+1}$
$CH_2=CHCOOC_2H_4N(CH_3)SO_2C_nF_{2n+1}$
$CH_2=C(CH_3)COOC_2H_4N(CH_3)SO_2C_nF_{2n+1}$
$CH_2=CHCOOC_2H_4N(C_2H_5)SO_2C_nF_{2n+1}$
$CH_2=C(CH_3)COOC_2H_4N(C_2H_5)SO_2C_nF_{2n+1}$
$CH_2=CHCOOC_2H_4N(C_3H_7)SO_2C_nF_{2n+1}$
$CH_2=C(CH_3)COOC_2H_4N(C_3H_7)SO_2C_nF_{2n+1}$
$CH_2=CHCOOC_2H_4C_nF_{2n}CF(CF_3)_2$
$CH_2=C(CH_3)COOC_2H_4C_nF_{2n}CF(CF_3)_2$

Among the (meth)acrylate ester compounds given above, compounds with $R_1=C_2H_4$ are preferably used. Generally, mixtures of linear perfluoroalkyl groups with various n values can be used from the viewpoints of performance and cost.

As comonomers to be copolymerized with the perfluoroalkyl group-containing (meth)acrylate ester, lower alkyl methacrylate with a lower alkyl group having 1 to 4 carbon atoms, benzyl (meth)acrylate or vinylidene chloride is selected from viewpoints of both water- and oil-repellency and freeze-thaw stability. To satisfy these two requirements, about 30 to about 90% by weight, preferably about 45 to about 85% by weight, of the perfluoroalkyl group-containing (meth)acrylate monomer and about 70 to about 10% by weight, preferably about 55 to about 15% by weight, of lower alkyl methacrylate, benzyl (meth)acrylate or vinylidene chloride are copolymerized, sum total being 100% by weight.

The fluoroalkyl group-containing copolymer comprising these essential components can be further copolymerized with not more than 10% by weight, preferably about 0.5 to about 7% by weight on the basis of the total copolymer, of a hydroxyl group-containing monomer such as hydroxyethyl (meth)acrylate, hydroxypropyl (meth)acrylate, 3-chloro-2-hydroxypropyl methacrylate, glycerine monomethacrylate, aikyleneglycol mono(meth)-acrylate, etc. These hydroxyl group-containing monomers can improve the adhesion of the water- and oil-repellent agent or improve the durability of the water- and oil-repellent agent by using a cross-linking agent reactive with the hydroxyl group.

The copolymer can be further copolymerized with not more than about 10% by weight, preferably about 0.5 to about 7% by weight on the basis of the total copolymer, of a cross-linkable group-containing monomer such as N-methylol (meth)acrylamide, N-methoxymethyl acrylamide, N-butoxymethyl acrylamide, acrylamide, glycidyl (meth)acrylate, etc. These cross-linkable group-containing monomers can improve the durability of the water- and oil-repellent agent by cross-linking with hydroxyl groups on fiber surfaces or self cross-linking.

Copolymerization reaction can be carried out by emulsion polymerizing at least one of lower alkyl methacrylate, benzyl (meth)acrylate and vinylidene chloride with polyfluoroalkyl group-containing (meth)acrylate ester in the presence of a nonionic emulsifier containing α-[1-(allyloxy)methyl-2-(p-nonylphenoxy)ethyl-ω-hydroxy (polyoxyethylene). α-[1-(Allyloxy)methyl-2-(nonylphenoxy)ethyl]-ω-hydroxy(polyoxyethylene) used, in the reaction is an unsaturated group-containing nonionic emulsifier represented by the following general formula:

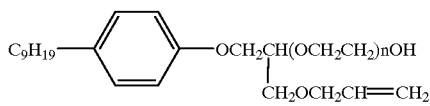

and those with mole numbers n of added ethylene oxides= 10, 20, 30 or 40 are commercially available as Adeka Rearsoap NE series, products of Asalhi Denka Kogyo K.K., Japan. Mole number n is not limited thereto, and generally a range of 10 to 80 is available for n.

Such an unsaturated group-containiing nonionic emulsifier is used in a proportion of about 0.5 to about 5% by weight, preferably about 1 to about 4% by weight, to the weight of the monomer mixture. Below about 0.5% by weight, no desired freeze-thaw stability will be obtained, whereas above about 5% by weight the water- and oil-repellency will be lowered.

It is desirable to use the unsaturated group-containing nonionic emulsifier together with other ordinary nonionic emulsifiers. For the other nonionic emulsifier, polyoxyethylene ether derivatives such as polyoxy-ethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, etc. can be used in a proportion of about 1 to about 8% by weight, preferably about 2 to about 6% by weight to the 3=j3 weight of total monomer mixture and in a ratio of about 1 to about 3, preferably about 1.5 to about 2.5 by weight to the unsaturated group-containing nonionic emulsifier.

Radial initiator for use in the present invention includes, for example, an organic peroxide, an azo compound, a persulfate, etc. Preferable are potassium persulfate, ammonium persulfate, 2,2'-azobis(2-aininodipro- pane) ·dihydrochloride, etc.

Emulsion polymerization reaction is carried out in water as a medium, at about 40° to about 80° C. for about 1 to about 10 hours to obtain an aqueous emulsion having a solid concentration of about 30 to about 50% by weight, preferably about 30 to about 45% by weight. For improving the stability against freeze, selection of fluorine-free monomer is important and the solid concentration of the resulting aqueous emulsion is next important, where the freeze stability will increase with increasing solid concentration. Below about 30% by weight, no desired freeze-thaw stability will be obtained even if an appropriate monomer is selected as a fluorine-free monomer.

To obtain an aqueous emulsion having such a solid concentration range, the polymer concentration must be increased as a matter of course, but a rapid increase in polymer concentration will give rise to risky much heat release during the polymerization reaction. In that case, it is not preferable from the viewpoint of safety to charge all the monomer mixture into the reaction system at once, but preferable to charge it dividedly or portion by portion therein.

Generally, water starts to freeze with decreasing temperature of the aqueous emulsion, thereby initiating ice crystal growth. With the initiation of ice crystal growth, emulsion particles per se will approach one to another, thereby initiating fixing the particles per se. When there are protective layers on the surfaces of individual particles, no such fixing will take place owing to the strong protective layers, if the particles are subject to pressures from the ice crystals. Without the presence of effective protective layers, fixing of particles per se will take place and the fixed particles will not be disengaged one from another when the aqueous emulsion is returned to room temperature, resulting in an increase in viscosity, formation of precipitates, entire solidification, etc. A protective layer can be formed by the emulsifier to be used for the polymerization reaction, but no such a strong protective layer as to withstand the pressures from the ice crystals can be formed on the particles.

In the present invention, on the other hand, an emulsifier component, can be effectively combined with the surface of polyfluoroalkyl group-containing copolymer by using an unsaturated group (allyl group)-containing, nonionic emulsifier, whereby strong protective layers can be formed against ice crystals.

Thus, in the present invention an aqueous emulsion having a solid concentration of about 30% by weight or more can be obtained by using an unsaturated group-containing nonionic emulsifier. The present aqueous emulsion has a distinguished freeze-thaw stability without any special care of storing in the winter season or transportation to the cold districts, and can be effectively used as a water- and oil-repellent agent upon dilution to a solid concentration of about 0.1 to about 1% by weight by water.

PREFERRED EMBODIMENTS OF THE INVENTION

The present invention will be described in detail below, referring to Examples and Comparative Examples.

EXAMPLE 1

$CH_2$=$CHCOOC_2H_4C_nF_{2n+1}$ [FAAC] 300 g (n=9.0 on average of a mixture with n=6~14)

Methyl methacrylate [MMA] 175 g

2-Hydroxyethyl acrylate [HEA] 20 g

Polyoxyethylene nonylphenyl ether [Emulsifier A] 12.5 g (Emulgen 930, HLB=15.1, a product of Kao Corp., Japan)

Polyoxyethylene nonylphenyl ether [Emulsifier B] 12.5 g (Emulgen 950, HLB=18.2, a product of Kao Corp., Japan)

α-[1-(allyloxy)methyl-2-(p-nonylphenoxy)ethyl]-ω-hydroxypoly(oxyethylene) [Emulsifier C] 19.2 g (Adeka Rearsoap NE-40; n=40, aqueous 65% solution, a product of Asahi Denka K.K., Japan)

Deionized water 1,040 ml

The foregoing components were charged into a glass separable flask having a capacity of 2L, provided with a stirrer, subjected to emulsification treatment in a high pressure homogenizer (made by Nihon Seiki K.K., Japan) at a pressure of 600 Kgf/cm$^2$, and then stirred for 30 minutes, while injecting a nitrogen gas therein.

Then, 600 g of the resulting deoxygenated monomer emulsion was taken into an Erlenmeyer flask with ground stopper for addition, whereas the remaining monomer emulsion was admixed with 5 g of N-methylolacrylamide (N-MAM) dissolved in 20 ml of deionized water when the internal temperature of the separable flask was elevated to 40° C., and then further admixed with 12 g of 2,2'-azobis (2-amidinopropane). dihydrochloride (V-50, a product of Wako Pure Chemical Co., Ltd, Tokyo) dissolved in 100 ml of deionized water.

The internal temperature was gradually elevated to 65° C., and then 600 g of the monomer emulsion taken into the Erlenmeyer flask in advance was dropwise added to the separable flask so carefully that the internal temperature might not exceed 70° C. Reaction was carried out at that temperature for 4 hours. After the reaction, the reaction mixture was cooled, whereby 1,682 g of an aqueous emulsion having a solid concentration of 31.0% by weight was obtained (percent recovery: 94.9%).

EXAMPLE 2

In Example 1, the same amount of ethyl methacrylate (EMA) was used in place of 175 g of MMA and 15.6 g of α-[1-(allyloxy)methyl-2-(p-nonylphenoxy)ethyl]-ω-hydroxypoly(oxyethylene) [Emulsifier D] (Adeka Rearsoap NE-20; n=20, aqueous 80% solution, a product of Asahi Denka Kogyo K.K., Japan) was used in place of Emulsifier C. An aqueous emulsion having a solid concentration of 31.0% by weight was obtained.

EXAMPLE 3

In Example 1, 140 g of MMA and 35 g of EMA were used in place of 175 g of MMA and the same amount of N-methoxymethylacrylamide(M-MAM) was used in place of 5 g of N-MAM. An aqueous emulsion having a solid concentration of 31.0% by weight was obtained.

EXAMPLE 4

In Example 1, the same amount of vinylidene chloride (VdCl$_2$) was used in place of 175 g of MMA. An aqueous emulsion having a solid concentration of 31.0% by weight was obtained.

EXAMPLE 5

In Example-1, the same amount of benzyl methacrylate (BzMAC) was used in place of 175 g of MMA. An aqueous emulsion having a solid concentration of 31.0% by weight was obtained.

EXAMPLE 6

In Example 1, the same amount of benzyl acrylate (BzAC) was used in place of 175 g of MMA. An aqueous emulsion having a solid concentration of 31.0% by weight was obtained.

EXAMPLE 7

In Example 1, 140 g of VdCl$_2$ and 35 g of BZMAC were used in place of 175 g of MMA. An aqueous emulsion having a solid concentration of 30.5% by weight was obtained.

EXAMPLE 8

In Example 1, 140 g of VdCl$_2$ and 35 g of BzAC were used in place of 175 g of MMA. An aqueous emulsion having a solid concentration of 30.5% by weight was obtained.

EXAMPLE 9

In Example 3, the amount of deionized water was changed to 542 ml. An aqueous emulsion having a solid concentration of 45.1% by weight was obtained.

EXAMPLE 10

In Example 3, the amount of deionized water was changed to 542 ml and the same amount of N-MAM was used in place of 5 g of M-MAM. An aqueous, emulsion having a solid concentration of 45.1% by weight was obtained.

COMPARATIVE EXAMPLE 1

In Example 1, no Emulsifier C was used and the amount of deionized water was changed to 1,358 ml. After the emulsification treatment and stirring with injection of the nitrogen gas, the internal temperature of the separable flask was elevated to 40° C., and admixing with the aqueous N-methylolacrylamide solution and the aqueous 2,2'-azobis (2-amidino-propane). dihydroceloride solution was likewise carried out. Then, the internal temperature was elevated to 70° C. and reaction was carried out at that temperature for 4 hours. After the reaction, the reaction mixture was cooled, whereby 1,994 g of an aqueous emulsion having a solid concentration of 26.0% by weight was obtained (percent recovery: 94-3%).

COMPARATIVE EXAMPLE 2

In Comparative Example 1, the same amount of EMA was used in place of 175 g of MMA, and the same amount of M-MAM was used in place of 5 g of N-MAM.

COMPARATIVE EXAMPLE 3

In Comparative Example 1, 140 g of MMA and 35 g of EMA were used in place of 175 g of MMA and the same amount of M-MAIM was used in place of 5 g of NAM.

COMPARATIVE EXAMPLE 4

In Comparative Example 1, the same amount of VdCl$_2$ was used in place of 175 g of MMA

COMPARATIVE EXAMPLE 5

In Comparative Example 1, the same amount of BzMAC was used in place of 175 g of MMA

COMPARATIVE EXAMPLE 6

In Comparative Example 1, the same amount of BzAC was used in place of 175 g of MMA.

COMPARATIVE EXAMPLE 7

In Comparative Example 1, 140 g of VdCl$_2$ and 35 g of BzMAC were used in place of 175 g of MMA.

COMPARATIVE EXAMPLE 8

In Comparative Example 1, 140 g of VdCl$_2$ and 35 g of BzAC were used in place of 175 g of MMA.

COMPARATIVE EXAMPLE 9

In Comparative Example 1, the same amount of 2-ethylhexyl methacrylate was used in place of 175 g of methyl methacrylate.

COMPARATIVE EXAMPLE 10

In Comparative Example 1, the same amount of lauryl methacrylate was used in place of 175 g of methyl methacrylate.

COMPARATIVE EXAMPLE 11

In Comparative Example 1, the same amount of stearyl methacrylate was used in place of 175 g of methyl methacrylate.

EXAMPLES 11 TO 20 AND COMPARATIVE EXAMPLES 12 TO 22

Solid concentrations of aqueous emulsions obtained in the foregoing Examples 1 to 10 and Comparative Examples 1 to 11 were each diluted with water to 0.5% by weight or 0.25% by weight, and two kinds of cloth, i.e. nylon/taffeta and polyester/amunzen were dipped into treating baths of these diluted emulsions, squeezed up to the desired pickups by a mangle and then dried and cured under the following treating conditions:

| Treating conditions | Nylon/taffeta | Polyester/amunzen |
|---|---|---|
| Solid concentration of Treating bath (wt. %) | 0.5 | 0.25 |
| Pickup (%) | 40 | 60 |
| Drying condition | | |
| Temperature (° C.) | 80 | 80 |
| Time (min.) | 10 | 10 |
| Curing condition | | |
| Temperature (° C.) | 170 | 150 |
| Time (min.) | 1.5 | 3 |

Water-repellency and oil-repellency of each cloth treated with the water- and oil-repellent agent were determined:
Water-repellency: represented by numbers 0 to 100 by spray test according to JIS L-1092(1992), where a larger number shows better repellency
Oil- repellency: represented by number 0 to 8 according to AATCC TM-118(1992), where a larger number shows a better repellency Furthermore, the freeze-thaw stabilities of aqueous emulsions obtained in Examples 1 to 10 and Comparative Examples 1 to 11 were determined.

Freeze-thaw stability: an aqueous emulsion was kept in a refrigerator at –25° C. for 16 hours and then kept at room temperature for 8 hours. Then, while visually observing the state of the aqueous emulsion, the test was repeated until changes in layer separation, viscosity increase, precipitation, solidification, etc. were observed to count the maximum number of repetitions of freeze-thaw.

The results are shown in the following Table.

TABLE

| Example and Comp. Ex. No. | Aqueous Emulsion | Water- and oil-repellency (water-repellency/oil-repellency) Nylon | Water- and oil-repellency (water-repellency/oil-repellency) Polyester | Number of repetition of freeze-thaw |
|---|---|---|---|---|
| Example 11 | Example 1 | 100/3 | 100/3 | 10 or more |
| Example 12 | Example 2 | 100/3 | 100/3 | 10 or more |
| Example 13 | Example 3 | 100/3 | 100/3 | 10 or more |
| Example 14 | Example 4 | 100/4 | 100/4 | 10 or more |
| Example 15 | Example 5 | 100/4 | 100/4 | 10 or more |
| Example 16 | Example 6 | 100/4 | 100/4 | 10 or more |
| Example 17 | Example 7 | 100/4 | 100/4 | 10 or more |
| Example 18 | Example 8 | 100/4 | 100/4 | 10 or more |
| Example 19 | Example 9 | 100/3 | 100/3 | 10 or more |
| Example 20 | Example 10 | 100/3 | 100/3 | 10 or more |
| Comp. Ex. 12 | Comp. Ex. 1 | 100/3 | 100/3 | 0 |
| Comp. Ex. 13 | Comp. Ex. 2 | 100/3 | 100/3 | 0 |
| Comp. Ex. 14 | Comp. Ex. 3 | 100/3 | 100/3 | 0 |
| Comp. Ex. 15 | Comp. Ex. 4 | 100/4 | 100/4 | 0 |
| Comp. Ex. 16 | Comp. Ex. 5 | 100/4 | 100/4 | 0 |
| Comp. Ex. 17 | Comp. Ex. 6 | 100/4 | 100/4 | 0 |
| Comp. Ex. 18 | Comp. Ex. 7 | 100/4 | 100/4 | 0 |
| Comp. Ex. 19 | Comp. Ex. 8 | 100/4 | 100/4 | 0 |
| Comp. Ex. 20 | Comp. Ex. 9 | 100/3 | 100/3 | 0 |
| Comp. Ex. 21 | Comp. Ex. 10 | 100/3 | 100/3 | 0 |
| Comp. Ex. 22 | Comp. Ex. 11 | 100/3 | 100/3 | 0 |

What is claimed is:

1. An aqueous emulsion, which comprises a copolymer of:
   (A) at least one of lower alkyl methacrylate, benzyl (meth)acrylate and vinylidene chloride; and
   (B) a polyfluoroalkyl group-containing (meth)acrylate ester,
      as dispersed in water, in the presence of a nonionic emulsifier containing α-[1-(allyloxy)methyl-2-(p-nonylphenoxy)-ethyl]-ω-hydroxy(polyoxyethylene).

2. An aqueous emulsion according to claim 1, wherein the fluoroalkyl group-containing (meth)acrylate ester is an ester compound represented by the following formula:

CH$_2$=CRCOOR$_1$Rf

3. An aqueous emulsion according to claim 1, wherein the copolymer is obtained by copolymerizing about 30 to about 90% by weight of (B) perfluoroalkyl group-containing (meth)acrylate ester with about 70 to about 10% by weight of (A) at least one of lower alkyl methacrylate, benzyl (meth)acrylate and vinylidene chloride.

4. An aqueous emulsion according to claim 1, wherein the copolymer is obtained by copolymerizing component (A) and component (B) in the presence of hydroxyl group-containing monomer.

5. An aqueous emulsion according to claim 4, wherein the hydroxyl group-containing monomer is copolymerized in an amount of not more than 10 percent by weight on the basis of total monomer mixture.

6. An aqueous emulsion according to claim 1, wherein the copolymer is obtained by copolymerizing component (A)

and component (B) in the presence of a cross-linkable group-containing monomer.

7. An aqueous emulsion according to claim 6, wherein the cross-linkable group-containing monomer is copolymerized in an amount of not more than 10 percent by weight on the basis of total monomer mixture.

8. A water- and oil-repellent agent, which comprises an aqueous emulsion comprising a copolymer of:
   (A) at least one of lower alkyl methacrylate, benzyl (meth)acrylate and vinylidene chloride; and
   (B) polyfluoroalkyl group-containing (meth)acrylate ester,
       as dispersed in water, in the presence of a nonionic emulsifier containing α-[1-(allyloxy)methyl-2-(p-nonylphenoxy)-ethyl-ω-hydroxy(poly-oxyethylene).

9. A water- and oil-repellent agent according to claim 8, wherein the aqueous emulsion has a solid concentration of about 30 to about 50% by weight.

10. A process for producing an aqueous emulsion, which comprises emulsion polymerizing.

(A) at least one of lower alkyl methacrylate, benzyl (meth)acrylate and vinylidene chloride; and
(B) with polyfluoroalkyl group-containing (meth)acrylate ester in the presence of a nonionic emulsifier containing α-[1-(allyloxy)methyl-2-(p-nonylphenoxy)ethyl]-ω-hydroxy(polyoxyethylene).

11. A process according to claim 10, wherein the α-[1-(allyloxy)methyl-2-(p-nonylphenoxy)ethyl]-ω-hydroxy (polyoxyethylene) as the unsaturated group-containing nonionic emulsifier is sued in a proportion of about 0.5 to about 5% by weight to the weight of total monomer mixture.

12. A process according to claim 11, wherein the unsaturated group-containing nonionic emulsifier is used together with other nonionic emulsifier.

13. A process according to claim 12, wherein the other nonionic emulsifier is used in proportion of about 1 to about 8% by weight to the weight of total monomer mixture and in a ratio of about 1 to about 3 by weight to the unsaturated group-containing nonionic emulsifier.

* * * * *